United States Patent [19]

Holliday et al.

[11] 4,156,075

[45] May 22, 1979

[54] TWO STEP POLYOLEFIN CATALYST DEACTIVATION

[75] Inventors: Robert E. Holliday; Edward H. Carter, Jr.; Thomas L. Doerr, all of Longview, Tex.

[73] Assignee: Eastman Kodak Company, Rochester, N.Y.

[21] Appl. No.: 828,574

[22] Filed: Aug. 29, 1977

[51] Int. Cl.$^2$ .............................. C08F 6/00; C08F 6/08
[52] U.S. Cl. ..................................... 528/483; 528/485
[58] Field of Search ................................ 528/483, 485

[56] References Cited

U.S. PATENT DOCUMENTS

| | | | |
|---|---|---|---|
| 3,001,977 | 9/1961 | Wisseroth et al. | 528/485 |
| 3,066,124 | 11/1962 | Telfer | 528/485 |
| 3,328,373 | 6/1967 | Tazewell et al. | 528/485 |
| 3,600,463 | 8/1971 | Hagemeyer et al. | 528/482 |

FOREIGN PATENT DOCUMENTS 882675 11/1961 United Kingdom ..................... 528/483

*Primary Examiner*—Stanford M. Levin
*Attorney, Agent, or Firm*—Clyde L. Tootle; Daniel B. Reece, III

[57] ABSTRACT

In a two step process for preparing polymeric material wherein said polymeric material is formed by polymerizing alpha-monoolefins in the presence of a halogen-containing polymerization catalyst that leaves corrosive halogen-containing catalyst residues in said polymeric material, the improvement which comprises contacting said polymeric material containing corrosive catalyst residues with steam, air and nitrogen at a temperature where the polymeric material is in a fluid or liquid state and thereafter treating said steam-air-nitrogen treated molten polymer with alumina. The polymeric material treated with the two step catalyst deactivation process had good color, low chlorides and low volatiles.

5 Claims, No Drawings

4,156,075

TWO STEP POLYOLEFIN CATALYST DEACTIVATION

This invention relates to polymer manufacture and to the polymers thus-produced. In a particular aspect this invention relates to a novel process for the inactivation of catalyst residues in high molecular weight polyhydrocarbons and to the novel products of the process. In a more specific aspect this invention relates to a novel process for the inactivation of halogen-containing catalyst residues in amorphous low molecular weight polypropylene and propylene containing copolymers and the polymers prepared thereby.

Processes for the polymerization of olefinic hydrocarbons, such as ethylene, propylene, and butene-1 require the use of a catalyst system. The catalyst systems can include as one or more of the components, metal halides, certain metal alkyls and certain transition elements or other organometallic combinations. Commonly used catalyst systems contain a metal halide, such as titanium trichloride, and an organic-metallic compound such as triethyl aluminum or diethyl aluminum chloride or comparable halide-containing reducing agent. Residues of halide-containing catalyst components if permitted to remain in the finished polymer even in small amounts are undesirable since they are highly corrosive to metallic surfaces.

Hence a number of procedures have been proposed for treating such catalyst residue in the polymers. One procedure involves boiling or washing the polymer with an alochol, such as a butyl or isobutyl alcohol, which reacts with the halide-containing residue to form soluble compounds that can be readily washed from the polymer. It has also been proposed that certain acidic materials be used to act upon the residual catalyst for solubilizing purposes. Then by filtering, centrifuging, further washing or similar procedures it is possible to remove undesired soluble catalyst components and leave a purified polymer. However, it is apparent that such purification treatments not only involve time and expense but because of the large volumes of polymer materials to be handled the capital expense for even simple tanks, centrifuges and similar apparatus items is substantial. Therefore, it is apparent that the development of a simplified procedure for handling the above type problem represents an advance in the state of the art.

The prior art related to this invention has been concerned with catalyst deactivation and/or removal of catalyst residues from high molecular weight crystalline polymers, specifically polyethylene and polypropylene. Several steam-air deactivation processes for polyolefins are described in the prior art. The processes described utilize conditions such that finely divided polyolefins containing catalyst residues are contacted with steam and air in a fluidized bed or some other convenient means at a temperature below the fusion point of the polymer. Chemical deactivants such as triethyl phosphate are often used in combination with the steam-air treatment. The function of the chemical deactivant is to react with residual inorganic chloride and convert the chloride into a volatile organic chloride (ethyl chloride is the product formed from triethyl phosphate).

U.S. Pat. No. 3,600,463 is concerned with the reduction of chlorides by alumina treatment of polymer solutions. In the process described in this patent, a solution of polymer is first filtered to remove the major portion of the residual catalyst. After filtration, the polymer solution is contacted with alumina to remove substantially all of the remaining catalyst residue.

Although the separate use of steam-air treatment of polyolefins and alumina treatment of polyolefins as a method of catalyst deactivation and/or removal are disclosed in the prior art, considerable improvements have been made in each of these operations and by combining these two procedures a simplified catalyst deactivation process has been developed. This invention is, as mentioned above, particularly applicable to deactivation of catalyst contained in amorphous polymers of low molecular weight. Because of the low softening point and tackiness of these polymers, it is not convenient to steam-air treat polymers of this type at temperatures high enough to effect deactivation of residual catalyst and still prevent polymer from sticking together. Also, since these polymers are prepared in solution, they are not obtained in a physical form (such as a powder) which would permit steam-air treatment in a fluidized bed or similar process. However, because of the combination of low polymer melt viscosity and low polymer fusion temperature, excellent contact of catalyst residue contained in the polymer can be achieved by contacting molten polymer with steam-air-nitrogen mixtures. Under optimum conditions a chloride level in the polymer of 20 to 60 ppm is routinely obtained after steam-air-nitrogen treatment at 160°–190° C. Any solvent used in the polymerization process is also conveniently removed during steam-air-nitrogen treatment, thus eliminating the need for a separate concentration step in processing.

In U.S. Pat. No. 3,600,463 it was disclosed that alumina treatment of dilute polymer solutions after filtration to remove the major portion of catalyst residues resulted in polymer containing very low ash and low chlorides. In view of this disclosure it was quite unexpected to find that steam-air-nitrogen treated polymer containing less than 1 percent volatiles could be, without removal of deactivated catalyst residues, alumina treated to yield a polymer of improved color having less than 10 ppm chloride. It was interesting to note that the ash content of the polymer was not much different in samples before alumina treatment and after alumina treatment. This innovation provides a much simplified procedure for alumina treating polymer compared with U.S. Pat. No. 3,600,463 in that the dilution, filtration and concentration steps are eliminated. The economic incentive for such improvements in the process is obvious.

This invention has for an object to provide simplified and relatively economical process for rendering inert, deactivated or otherwise minimized or eliminated the corrosive and undesirable effects of residual catalyst in a polymer prepared by procedures utilizing a catalyst that leaves halogen-containing residues in the polymer. A further object is to provide a novel process for rendering catalyst inert in hydrocarbon polymers, such as polyethylene and polypropylene, whether the polymers are prepared by processes utilizing reaction media or no reaction medium is used. It is a further object to provide a process of the class indicated which may be applied to hydrocarbon polymers, such as polybutene, polypropylene, random copolymers of propylene/butene-1, propylene/ethylene, as well as block copolymers of such monomers, and the like. A still further object is to provide a process which is characterized in its simplicity for inactivating small amounts of certain catalyst residues remaining in polymerized polymeric compositions. Another object is to provide a process for the purposes indicated which does not require extensive additional capital expenditures for equipment and which is compatible and readily adaptable to existing polymerization processes and apparatus. Other objects will appear hereinafter.

In its broader aspects the two step or steps pertaining to the practice of the present invention, degassed polymer from a continuous reactor is fed into a contactor vessel where the temperature is maintained high enough to keep the polymer in a fluid state. A mixture of steam, air and nitrogen is continuously sparged through the polymer solution using a polymer residence time of around 3–5 hours. Polymer from the contactor is very low in volatiles (less than 1 percent), has good color (2–3 Gardner), and low chloride levels (20–60 ppm). It is most convenient to operate the steam-air-nitrogen contactor in a continuous manner; however, batchwise operation produces similar results.

The molten polymer from the steam-air-nitrogen contactor is then pumped through an alumina bed which is maintained at about 230° C. A suitable alumina for use in the bed is one such as Alcoa F-1 alumina. The residence time of the polymer in the alumina bed is around 1–3 hours. The polymer which has been first steam-air-nitrogen treated and then alumina treated has excellent color (1–2 Gardner) and a low chloride level (less than 10 ppm) which renders this material low in corrosiveness.

This invention is a simplified process for producing a polymer having good color and low corrosiveness thus eliminating the need for alcohol washing or high temperature filtration of the catalyst residues from the polymer. This process is particularly well suited for low molecular weight, low melting polymers such as amorphous propylene butene copolymers. It is also particularly well suited for polymers which are prepared in a solution polymerization process since solution prepared polymers are not readily worked up by washing with alcohol.

Conversion of polymer containing catalyst residues and solvent into good color, low volatile, noncorrosive polymer can be accomplished in a simple two-step process. No separate washing, filtration, or concentration steps are required.

In theory $TiCl_3$, aluminum alkyls, and aluminum chlorides can be converted into white noncorrosive products by treatment with oxygen (air) and water as shown in the equations below:

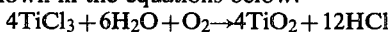
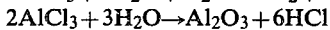

$4TiCl_3 + 6H_2O + O_2 \rightarrow 4TiO_2 + 12HCl$
$2AlCl_3 + 3H_2O \rightarrow Al_2O_3 + 6HCl$
$AlEt_3 + 3H_2O \rightarrow Al(OH)_3 + 3EtOH$ Conversion of the $TiCl_3$-aluminum alkyl catalyst residues into $TiO_2$ and $Al_2O_3$ and removal of the volatile hydrogen chloride from the polymer should result in a good color, low chloride polymer requiring no further purification.

Our novel chemical deactivating process is particularly well adapted for use in polymerization processes which produce polymer in solution or melt form and which normally are filtered to remove catalyst residues. In these processes the deactivating additive is added directly to the melt or solution and it reacts quickly to produce a volatile halide which is allowed to escape during processing. While the chemical deactivation process is particularly designed to avoid a filtering step, it may be used in combination with a filtering operation to remove more substantially all catalyst residues.

In the polymerization reaction of our process an ionic type of catalyst is used that is effective for polymerizing the α-monoolefinic hydrocarbons in the presence of an inert hydrocarbon solvent. Any of the halogen-containing ionic types of catalyst systems can be employed in our process. Disclosures of ionic types of catalysts that can be used can be found in Belgian Pat. Nos. 533,362, 534,792 and 538,782. The ionic catalysts that can be employed in our process can contain two or more components, and one of the components of our catalyst system can be a transition metal compound, such as a halide, an alkoxide, an alkoxy halide, an acetylacetonate and the like of a transition metal, such as titanium, zirconium, chromium, molybdenum, vanadium, and the like. A second component of the ionic catalyst system employed in our process can be a metal or an organo-metal compound. Among the metals that can be used are aluminum, the alkali metals, the alkaline earth metals, and the like. Among the organometal compounds that can be employed in our catalyst system are the alkyl derivatives of the alkali metals and alkaline earth metals. Also, the alkyl and alkyl halide derivatives of aluminum are effective components in our catalyst compositions. Specific organometal compounds that can be employed are sodium amyl, lithium butyl, magnesium diamyl, zinc diethyl, aluminum triethyl, aluminum tributyl, diethyl aluminum chloride, ethyl aluminum sesquichloride, and the like. The second component of the catalyst system can also be a hydride of any of the above-named metals, such as lithium hydride, sodium hydride, and the like, or a complex metal hydride, such as lithium aluminum hydride. In some instances in order to obtain the desired reaction a third component can be effectively employed in these catalyst compositions. Among the third components that can be used are the organophosphorus compounds, such as triethyl phosphine, tributyl phosphite, triethyl phosphate, hexamethyl phosphoric triamide, and the like. Other components of the catalyst systems that can be used are certain alkali metal halides, such as sodium fluoride and certain amines, arsines and stibines, such as tributylamine, triphenylarsine, triphenylstibine, and the like. The components of our catalyst compositions can be employed in equimolar ratios and highly satisfactory results can be obtained by employing a three-component catalyst system, such as those described above, with each of the components being in equal molar amounts.

A further understanding of our invention will be had from a consideration of the following examples which are set forth to illustrate certain preferred embodiments of our invention.

EXAMPLE 1

In a 4 liter resin flask fitted with a heating mantel and mechanical stirrer was placed 2 pounds of propylene/butene-1 copolymer solution (95 percent polymer, 5 percent mineral spirits) containing catalyst residues comprised of AA-$TiCl_3$, aluminum triethyl and reaction products thereof. The polymer solution was heated to 170° C. A mixture of steam, air and nitrogen was preheated to 170° C. and then bubbled into the polymer solutions through a stainless steel sparge ring positioned near the bottom of the flask. This treatment was continued for 3 hours. Solvent and steam condensate were removed overhead. The polymer, which was originally dark in color, gradually turned first bluish-gray and then white in color. The polymer treated in this manner had a 2-3 Gardner color, a chloride concentration of 34 ppm, and contained less than 0.5 percent volatiles.

EXAMPLE 2

The experiment in Example 1 was repeated except that only steam and nitrogen (no air) were added during the treatment. The polymer became blue-gray in color but did not change to white. When the flask was opened exposing the treated polymer to the air, the blue-gray color rapidly faded to white. This polymer had a chloride concentration of 26 ppm and volatiles less than 0.5 percent.

EXAMPLE 3

Same as Example 1, except steam-nitrogen added for 1.5 hours. The polymer was blue-gray at this stage. Steam-nitrogen-air was then added for 1.5 hours; the polymer became white. This polymer had 30 ppm chloride and less than 0.5 percent volatiles.

EXAMPLE 4

Steam-air-nitrogen treatment of propylene-butene copolymers was carried out in a continuous contactor, the construction and operation of which is described below:

The contactor was a hot oil traced glass column 6 inches in diameter and 6 feet long. Three Hastelloy "C" plates drilled with ⅛ inch holes were placed in the column at 18 inch intervals to serve as baffle plates. A sparge ring was located 12 inches from the bottom of the vertical column. Polymer solution was fed continuously into the column at a point 12 inches from the top. A mixture of steam-air-nitrogen was sparged through the molten polymer. The polymer temperature was maintained at 160°-190° C. Hydrogen chloride, steam, mineral spirits, and gases were taken off overhead. The treated polymer was taken off continuously from the bottom of the column.

The polymer from the contactor vessel was passed through an alumina bed which was maintained at 230° C. This procedure resulted in polymer having less than 10 ppm chloride and Gardner color of 1-2.

Although the invention has been described in considerable detail with particular reference to certain preferred embodiments thereof, variations and modifications can be effected within the spirit and scope of the invention as described hereinabove and as defined in the appended claims.

We claim:

1. A process for preparing amorphous polymeric material wherein said polymeric material is formed by polymerizing alpha-monoolefins in the presence of a halogen-containing polymerization catalyst that leaves corrosive halogen-containing catalyst residues in said polymeric material, the improvement which consists of contacting said polymeric material containing corrosive catalyst residues in a fluid state with steam, air and nitrogen until said material is white and thereafter treating said steam-air-nitrogen treated molten polymer with alumina to provide a polymeric material having less than 10 ppm chlorine.

2. A process according to claim 1 wherein said polymeric material is a propylene/butene-1 copolymer.

3. A process according to claim 2 wherein said steam, air, and nitrogen contacting is carried out at 160°-190° C.

4. A process according to claim 3 wherein said alumina treatment is carried out at 230° C.

5. A process according to claim 4 wherein said amorphous copolymer is contacted in solution containing about 95 percent copolymer and 5 percent mineral spirits.

* * * * *